July 23, 1957 H. F. MAY 2,800,642

MAGNETIC DISK SCANNING DEVICE WITH CHANNEL SELECTOR
FOR CONCENTRIC CIRCULAR TRACK SCANNING

Filed Feb. 10, 1954

INVENTOR
HAROLD F. MAY
BY [signature]
ATTORNEY 2,800,642
Patented July 23, 1957

2,800,642

MAGNETIC DISK SCANNING DEVICE WITH CHANNEL SELECTOR FOR CONCENTRIC CIRCULAR TRACK SCANNING

Harold F. May, Valley Stream, N. Y., assignor to The Teleregister Corporation, New York, N. Y., a corporation of Delaware Application February 10, 1954, Serial No. 409,336

8 Claims. (Cl. 340—174)

Figures 1, 2:
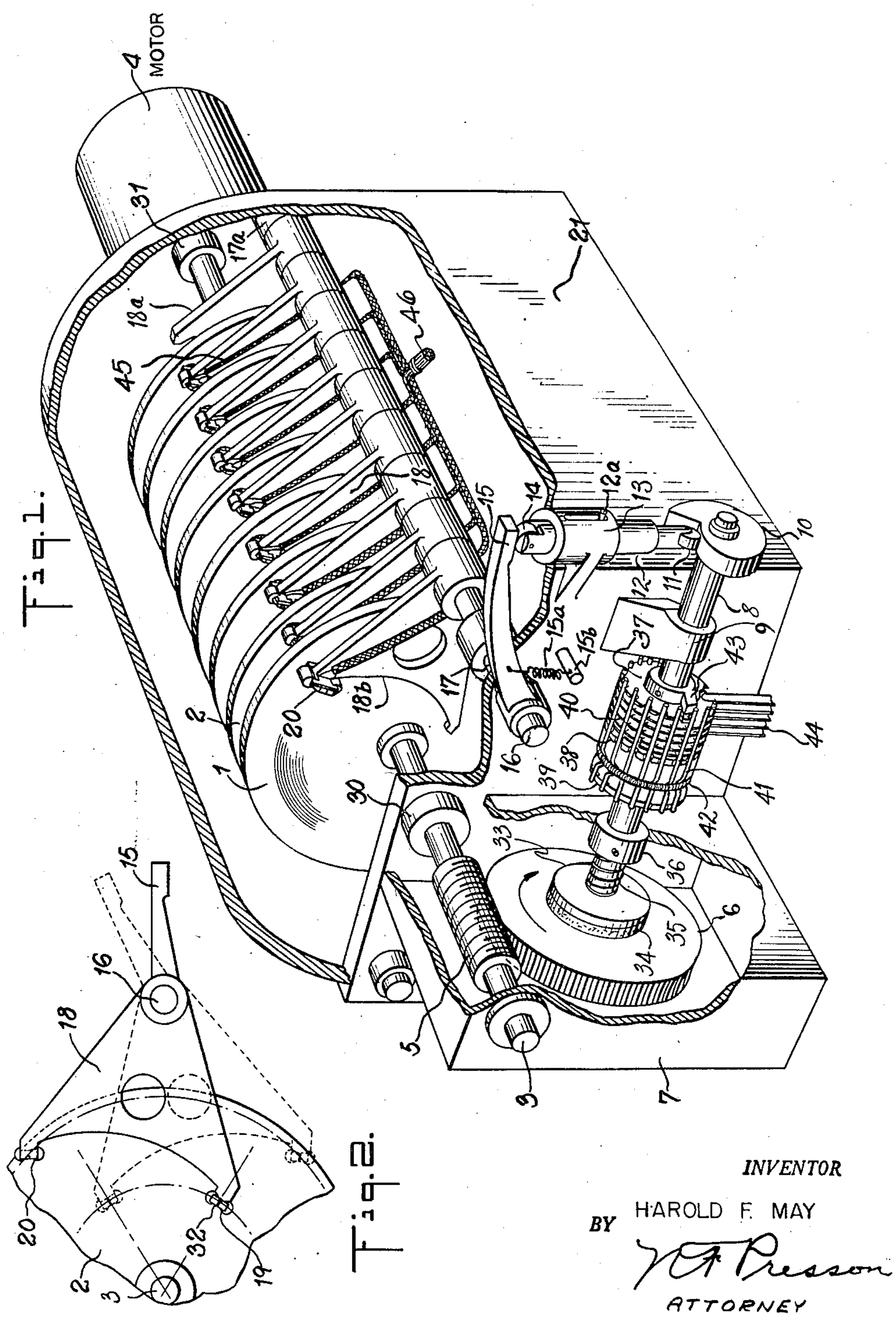

This invention relates to scanning devices for use in association with magnetic record disks. It pertains to systems in which a magnetic record is rotated continuously and is scanned selectively for the purpose of recording and playback of statistical items, such as are involved in computational work and the maintenance of an inventory, or the storage of transient data of any particular kind.

Heretofore it has been common practice to make such recordings and to obtain a playback of the same by means of recording heads, used alternatively as playback heads, these heads being disposed in close proximity to the periphery of a magnetically coated drum. With that arrangement a scanning head for recording and playback would usually be fixedly mounted so as to scan a single circular track on the periphery of the drum. If the volume of statistical data to be recorded was great, then numerous tracks and scanning heads would be required, each head to serve the recording and playback requirements in respect to the data that might be assigned for storage on a single track.

Practical design considerations have imposed certain limitations on the axial length and diameter of a magnetic drum as used for data storage. Other limitations as to the volume of statistical items which can be stored on a magnetic drum relate to the spacing between parallel recording tracks and to the so-called "packing factor," or spacing between adjacent "bits" of recordings along each track.

In an effort to expand the volume requirements of a magnetic storage medium the applicant has conceived this invention as one which comprises a plurality of disks having surface coatings of magnetizable material and being mounted for continuous rotation on a common shaft. Concentric circular recording tracks on both sides are selectively chosen for scanning by scanning heads which, prior to a scanning operation, are moved into scanning relation to desired tracks which have a particular radius. A mounting device is provided such that a plurality of these heads can be moved jointly into selected positions by means of a selector mechanism of well-known type, all of the heads being then disposed in scanning relation to circular tracks of the same radius on different disk sides.

In a copending application Serial No. 403,482, filed January 12, 1954, by Merton L. Haselton and George W. Dennis and entitled "Multiple Head Scanning Device for Magnetic Record Disks" and assigned to the assignee of this invention, a system is disclosed in which some of the components bear a certain resemblance to corresponding components of the instant embodiment of my invention. Disk recordings are shown in the aforesaid Haselton and Dennis case, but the tracks are of spiral formation and the scanning heads are oscillated cyclically in a fixed ratio to the disk revolutions so as to follow the spiral tracks. The objects of the Haselton et al. invention are well served by the construction which they disclose. However, it has been found that for certain applications of a magnetic memory, the adoption of a spiral track scanning technique is less desirable than the technique of selecting a particular circular track among those which are concentrically disposed on one side of a disk, and either entering or playing back an item the place for which is to be found in that track by the proper timing of gating pulses from a synchronizing pulse counter.

A primary object of my invention is to provide a novel magnetic record scanning device of the general type indicated by the above brief description. More specific objects include the provision of mechanism having a constantly rotatable spindle on which a plurality of magnetically coated disks are mounted, and in combination therewith a plurality of scanning heads commonly mounted on a rock shaft which in turn is arranged to be swung into any one of numerous scanning positions for causing the scanning heads or any one of them to carry out a scanning function by following a chosen circular track among those which are concentrically disposed on one face of a selected disk.

Another object of my invention is to provide mechanism for selectively setting the rock shaft mentioned in the preceding paragraph in response to signals received from a control source so that a recording or playback of a desired item may be had, the assigned place for this item being found in the selected circular recording track amongst those that are concentrically disposed on one face of a selected disk.

Still another object of my invention is to provide mechanism of the type above described wherein a source of synchronizing pulses of selectively variable frequency is used. This synchronizing pulse source comprises essentially a scanning head mounted on the above-mentioned rock shaft and disposed in scanning relation to the face of one of the disks on said constantly rotatable spindle. On this disk is a recording of magnetization spots in each of as many concentric circular recording tracks as there are circular recording tracks for data to be stored in the area of any one disk face. In each of the circular tracks of the sync. pulse generator disk there are as many magnetization spots as the circumference of that track will allow without exceeding the limits of the so-called "packing factor." This means that with constant speed of rotation of the disks the frequency of the sync. pulses generated will be greatest when scanning the outermost circular track both of the sync. pulse recording and of the data recording. The sync. pulse frequency as related to the different concentric circles of recording tracks is, therefore, so established that when a particular setting of the rock shaft and the scanning heads carried thereby is selected, a definite number of "bits" appropriate to the circumference of the selected circular scanning track for data recording will be covered in one revolution of the disks. Thus it becomes possible to maintain a substantially uniform packing factor for recordings of bits in all of the concentric recording tracks regardless of variations in their circumference. This arrangement is one which considerably increases the capacity of a given piece of magnetic memory equipment in relation to its physical size.

A single embodiment of my invention will now be shown and described, it being understood that the invention may be embodied in alternative forms within the scope of the claims. The following description will be best understood by reference to the accompanying drawing wherein:

Fig. 1 shows a perspective view of my preferred disk scanning device, with parts of the device broken away to show certain elements that would otherwise be hidden; and Fig. 2 is a view of a magnetic head-supporting plate in its relation to a record disk having circular tracks to be selectively scanned.

Referring to Fig. 1, there is shown a plurality of flat magnetically coated disks 1, 2, etc., fixedly mounted for rotation on a common shaft 3 which may be driven by a motor 4. The shaft is suitably journaled at both ends, and on the shaft is a worm 5 which meshes with a worm gear 6. The worm and worm gear are preferably enclosed in a gear box 7. A spindle 8 rotates in bearings one of which is shown at 9, while another bearing is provided at the rear of the gear box 7. Spindle 8 has the worm gear loosely mounted thereon. A clutch disk 33 is arranged to slip axially on the spindle 8, but is keyed thereto. Between the clutch disk 33 and the face side of the worm gear 6 is a friction washer 34 of suitable compressible material. A collar 36 is affixed to the spindle 8 and serves to maintain compression of a helical spring 35 so as to squeeze the washer 34 between the clutch disk 33 and the side of the worm gear 6. This arrangement is one, therefore, which enables the spindle 8 to be turned by and with the worm gear when free to do so and to be locked motionless when desired while the worm gear continues rotation.

Affixed to the spindle 8 is a cam 10 of helical contour. A cam follower roller 11 rides on the helical surface of the cam. Roller 11 is swiveled at one end of a slide rod 12, the other end of which carries a roller 14. A cylinder 13 holds the slide rod 12 in position to maintain an endwise thrust of its roller 14 against the underside of a lever 15. Lever 15 is affixed to a rock shaft 16 which swings in bearings 17 and **17*a* and which carries a number of supporting plates 18 for the scanning heads 19 and 20. The lever 15 has a helical spring 15*a* linked thereto, the other end of the spring being anchored fixedly to a pin 15*b*, this pin being affixed to the frame 21. The function of the spring 15*a* is to hold the lever 15 against the roller 14**.

The record disks 1, 2, etc., are spaced apart along the shaft 3 suitably to accommodate the free swinging of the scanning heads 19 and 20 between the disks. Generally speaking, the heads 19 and 20 are mounted in pairs on the supporting plates 18, and are selectively settable as a group so as to scan circular record tracks of different radii on the disks 1 and 2. The selecting mechanism is conventional, but will presently be described. Its function is carried out in such manner as to enable the spindle 8 and the cam 10 to rotate and to be stopped in a selected position, thereby to set the scanning heads at different radial distances from the axis of the record disks 1, 2, etc., and thus to place them in suitable scanning relation to the circular record tracks any one of which it may be desired to scan at a given time.

The mechanism as described in the two preceding paragraphs will now be seen to constitute means for obtaining access to different portions of the record tracks of the entire memory unit, it being understood that the scanning heads 19 in one row may be rocked into position to scan circular tracks of a selected radius, while the heads 20 will at the same time stand in position to scan circular tracks of a different radius. This selection having been made, another selection is a matter of conditioning one particular head to perform a scanning operation. This is conventional procedure in the gating of signals through the coils of a selected scanning head, the latter being otherwise known as a transducer head because of its dual function either to record information or to play back the same by readout.

The relative positions of scanning heads 19 and 20 are shown to better advantage in Fig. 2 than in Fig. 1. Those of the supporting plates for the scanning heads which intervene between two record disks have two heads mounted thereon; heads 20, as seen, being in an upper row, and heads 19, as hidden in Fig. 1, being in a lower row. A break-out in the perspective drawing sufficient to show any of the heads 19 was considered difficult of delineation and unnecessary since Fig. 2 is sufficient. However, since all of the heads 20 have their pole pieces facing disks to the right of them the supporting plate **18*a* carries no head 20, but only a head 19 that is hidden from view. Likewise the supporting plate 18*b* at the left end of the rock shaft 16 carries no head 19 but only a single head 20**.

The transducer heads, or scanning heads, when swung to any selected position for scanning circular tracks on the record disks must be held in that position during the performance of a scanning cycle, that is, for at least one revolution of the record disk shaft 3. Furthermore, a substantially constant and uniform spacing must be maintained between the pole pieces of the transducer heads and the disk surfaces to which they are respectively opposed. This spacing is determined as a minimum air gap for magnetic flux consistent with allowable tolerances in the mechanical design of the apparatus.

In order to control selectively the setting of the transducer heads so as to scan a circular track of any given radius, I prefer to utilize a signal-responsive selecting mechanism of the general type shown, for example, in Morton et al. Patent 1,821,110, issued September 1, 1931, and in Potts Patent 2,349,304, issued May 23, 1944. Such a selector commonly is used to arrest a normally rotating type-wheel shaft in any desired position for printing a character. The selector is of the so-called "pin-barrel" type. Code disks with notched peripheries are made responsive to a train of code signals and are settable to cause an alignment of notches somewhere according to the selection to be made. Different permutations of the code disk settings enable one of a number of surrounding stop pins to be brought into the path of the aligned notches in the code disks and thus to intercept a stop arm as it rotates, carried by the type-wheel shaft, arresting the latter in proper angular position to obtain a character printing. An analogous function may therefore be performed by such a pin-barrel selector when used in combination with the mechanical motion of my novel positioner for an array of scanning heads, so as to scan selected ones of a number of concentric circular record tracks. Certain of the elements of a similar pin barrel selector are shown in Fig. 1 of the instant application in order to indicate one of a number of possible methods of selective scanning head adjustment for obtaining access to a desired circular record track.

Referring again to Fig. 1, the pin barrel selector assembly is shown to surround the shaft 8, but having no contact therewith. The assembly is supported in some suitable manner by means attached to the frame 21. This manner of support is not here shown, since it is immaterial to the instant disclosure. The selector assembly comprises a central spool member (not shown) to which are fastened two guide disks 37 and 38 and a fulcrum disk 39. Rotatable upon the central spool through a small angular distance to one or the other of its two sole selective positions are several code disks 40. Five such code disks are here shown, assuming that a 5-unit selecting signal code might be adopted, and that it might be desirable to selectively position the transducer heads in scanning relation to any one of as many as 31 concentric tracks on each disk face. If, however, such tracks were limited to 15 in number per disk side, then it would be sufficient to employ only four code disks.

Spacers of appropriate form (not shown) serve to maintain a definite axial spacing of said code disks, but allow free rotary movement thereof. Disks 40 are formed with V-notches on their peripheries in accordance with a predetermined code after a well-known fashion and are limited in their angular movement by slotted holes therein engaging appropriate stops which form part of the fastening bolts for the selector assemblage. In operative relation with the code disks are stop pins 41 the number of which is equal to the number of selecting positions to be had for the orientation of the spindle 8 when it is to be arrested. The stop pins 41 are spaced equally about the periphery of the selector and are guided in radial slots in the guide disks 37 and 38. A notch in the fulcrum end of each pin 41 engages the edge of disk 39 and permits said pins to pivot freely thereon. A coil spring 42 girdles the pins and is retained in position by a bowed portion of each pin wherein the spring rests.

The spring 42 serves to move a selected pin centripetally when that particular pin is enabled to seat itself within an alignment of notches of the code disks. The spring also serves to prevent the pins from becoming accidentally displaced. The pins extend beyond the face of the guide disk 37 for a short portion of their length and into a plane of rotation of a stop arm 43 which is affixed to the spindle 8. Normally all of the pins are held outside the orbit of the stop arm's outer extremity, but a selected and actuated pin is moved into that orbit and intercepts the stop arm, preventing its further rotation until a scanning cycle can be consummated.

Selective settings of the code disks 40 are brought about in response to received character code combinations transmitted from either a local or a remote source. For this purpose it is usual in the teleprinter art to provide selecting magnets each of which is energized in response to a marking signal but remains unenergized as indicative of a spacing signal. Such magnets have not been shown herein, since they and their function are well known and fully understood. Their armatures are, however, mechanically linked with fingers 44 the ends of which fit into notches of the disks 40 and cause the latter to be rotated through a small angle when they are to be set according to a code signal element of "mark" significance; or to remain unmoved if they are to be set according to a code signal element of "space" significance. After deenergization of any of the selecting magnets it is conventional to restore the corresponding code disk 40 to its non-selected position by means of a retractile spring. The action of each selecting magnet upon its appropriate code disk is independent of the others. Furthermore, means can be provided for locking the code disks in their selected positions, if desired, so that the selecting magnets need not be held energized while a scanning operation respecting magnetic recordings is performed. Such locking means is also conventional and is not here shown, it being a matter of detail which is described in the aforementioned Morton and Potts patents.

The notches in the disks 40 are arranged so that selective permuted combinations of the disks will allow a row of notches to be aligned at a certain peripheral line where a stop pin 41 will be forced by the spring 42 to a position closer to the center than normal, the pin entering the aligned disk notches. Upon a different selective combination of the disks occurring, the pin that had entered an alignment of code notches will be cammed out by teeth between the notches and a new pin will drop into the new selective alignment.

The interception of the stop arm 43 by selection of a certain pin 41 has been explained above. It will now be seen that, whereas the spindle 8 is allowed to rotate normally and continuously until the pin-barrel selector is caused to function in response to a received code signal, the arrest of the spindle 8 by the performance of that function is one which results in the setting of the cam 10 at a certain point at which the rock shaft 16 will have brought the scanning heads into a wanted scanning relation to circular memory tracks of a particular radius. The array of scanning heads 19 will then be opposed to memory tracks of one radius and at the same time the scanning heads 20 will be opposed to memory tracks of another radius. Any one of the heads 19 or any one of the heads 20 may then be selected according to the programming of data recording or playback to be executed. Suitable means for making such a selection are well known in the art and hence are not described herein, and it will be understood that conventional circuitry may be employed along with usual electronic gating techniques.

In setting forth the objects of my invention I have shown the desirability of obtaining a fairly uniform packing factor for bit recordings independent of the radius of a circular track in which such recordings lie. This uniform packing factor, however, involves varying the frequency of the sync. pulse generating means according to the number of bits which can be disposed within the circumference of a circular track of any particular radius. I have chosen, therefore, to utilize one of the scanning heads 19, Fig. 2, for playback of synchronizing, or timing, pulses from a permanent recording on an operatively associated disk face whenever any different one of the scanning heads 19 is selected for a transducer operation. All of the heads 19 being in alignment at all times, it is apparent that a playback of synchronizing pulses from a circular synchronizing pulse track of selected radius will be of suitable frequency to properly control a gating operation as required for the functioning of the selected scanning head 19 as used for data recording or playback. Thus the setting of the rock shaft 16 accomplishes simultaneously the positioning of the synchronizing pulse scanning head and the selected data scanning head both to scan circular tracks of the same radius.

What has been explained in the preceding paragraph respecting the use of one scanning head 19 for synchronizing pulse generation and any selected one of the remaining heads 19 for data recording and playback applies equally well with respect to the scanning heads 20. It is important to observe, however, that selecting means must be employed so as to condition the synchronizing pulse scanning head 19 to deliver synchronizing pulses whenever a data transducing head 19 is to function, and likewise to condition the synchronizing pulse scanning head 20 to deliver synchronizing pulses whenever a data transducing head 20 is to function.

It is possible to so design the contour of the periphery of cam 10 that, when it is rotated through equal arcs corresponding to the movements between points of arrest of the stop arm 43, the rock shaft 16 will also be swung through approximately equal arcs. This would be especially desirable if the head carrier plates 18 were also designed to swing the transducer heads through arcuate paths wherein the mid-point of the swing would be substantially tangent to a radius of the record disk 1 or 2. In this case the plates 18 would be proportioned so as to swing the heads more nearly in the direction of the shaft 3 as they approach the position for scanning the innermost circular record path than as shown in Fig. 2. In that figure the heads are shown to veer away from a centripetal direction with respect to the record disk centers. This design as shown has merit in that when the heads are mounted nearer to their axis of oscillation the plates 18 can be of smaller proportions and therefore less massive. On the other hand the design as shown in Fig. 2 suffers in comparison with the one first described above because the radial distances between adjacent record tracks near the disk centers must of necessity be smaller than corresponding distances between adjacent record tracks near the record disk peripheries. In either case the radial spacing between concentric record tracks has to be governed by the permissible packing factor as it relates to adjacent tracks, but irrespective of the lineal spacing of bits along each circular track. As regards the latter it is only necessary to locate the recordings of synchronizing pulse bits in the synchronizing channels according to permissible tolerances.

The scanning heads for synchronizing pulse generation are, of course, connected to conventional amplifier means (not shown) and thence to such electronic equipment as is to be served with timing pulses. Usually there is a small gap between the start and finish ends of the synchronizing pulse recordings on each of the concentric tracks. Such gap is useful in developing a stop-start signal for the count of pulses generated within each disk revolution. An electronic pulse counter may be made responsive to synchronizing pulses as generated by the scanning of any one of the several concentric circular sync. channels. The counter will count up to the limit of pulse recordings as found in any given track. But when the stop-start signal occurs the counter will be automatically reset, as is conventional.

As a modification of my invention, the cam 10, instead of having a spirally formed contour, may be heart-shaped like that disclosed for a similar purpose in a copending application of Haselton and Dennis for a Multiple Head Scanning Device for Magnetic Disk Records, Serial No. 403,482, filed January 12, 1954, and assigned to the assignee of the instant application. When a heart-shaped cam is used the heads will be allowed to move inwardly and outwardly of scanning areas on the disks 1, 2, etc., at approximately the same speed in order to travel from one to another setting and to start scanning a different circular track of selected radius. This mode of control of the setting mechanism for the scanning heads, including the transducer heads for data recordings and also the synchronizing track scanning heads has the advantage that it avoids considerable mechanical shock and wear due to the dropping of the cam follower roller 11 abruptly from a high point to a low point of the cam's contour.

In the design of a heart-shaped cam to replace cam 10 as shown, it is important that its contour be made such as to position the scanning heads in scanning relation to a selected one of an odd-numbered series of circular tracks, counting them in the order of their expanding radii, provided that the setting mechanism is stopped with the cam follower roller 11 riding on one side of the heart-shaped cam 10; and on the other hand, to position the scanning heads in scanning relation to a selected one of an even numbered series of circular tracks, counting them as aforesaid, provided that the setting mechanism is stopped with the cam follower roller 11 riding on the other side of the cam 10. Furthermore, it is important that the contour of the heart-shaped cam 10 be made such as to allow for a substantially uniform radial spacing between the record tracks. In order to accomplish this it will be apparent that the two sides of the cam 10 will deviate somewhat from perfect symmetry. Then, too, compensation must be provided for the non-linear characteristics of the mechanical movements, including the tangential linkage between the slide rod 12 and the lever 15, and including the arcuate paths of the scanning heads as they veer away from an aim toward the axle 3 on approach to the innermost record track.

I do not wish to limit the scope of my invention to embodiments which include a selector of the pin-barrel type. The selective setting of the scanning head arrays can be accomplished equally well, if desired, by other known types of code-responsive setting mechanisms, for example, the type which comprises a set of internally notched code rings and a seeker arm which normally rotates until its latch member finds an alignment of code notches and is stopped from turning by an outward or centrifugal movement into such notch alignment.

It is desirable to mount each of the scanning heads on their supporting plates 18 in such manner that the gap between their two pole pieces shall be aligned with a radius of the adjacent record disk when scanning the innermost circular track thereon. This will be more clearly seen by reference to Fig. 2. There it is shown diagrammatically that when the head 19 or 20 has been swung into position to scan the innermost one of the concentric circular tracks the gap separating the two poles of the scanning head is aligned with the radius of the disk 2 at the scanning point. The pole piece faces of the head in this position are delineated with full lines and the gap between the poles is shown in connection with head 19 as a line 32 because the gap is very thin. This orientation of the pole pieces permits of the adoption of an optimum packing factor for the recording of bits in the innermost circular track, where the number of bits is at best smaller than in the tracks of greater radius. When the heads are swung into position to scan these tracks of greater radius, the gap between pole pieces is at an angle to the disk radius at the scanning point and therefore calls for the adoption of some packing factor which is found to be an optimum, considering the unavoidable effects of the gap angle.

My novel scanning device is adapted for use in cooperative association with electronic equipment of various types and for the storage of statistical data in tubular form in such manner as to be readily accessible whenever needed by conditioning selected transducer heads to play back the stored information. Thus it is usual to connect these transducer heads through gating circuits to amplifier equipment which is comprised in any electronic system. I show in Fig. 1 certain conductors 45 pairs of which are individually connected to each transducer head 19 and 20. These are preferably gathered together into a bundle or multi-conductor cable 46 and will be understood to be carried into the electronic system, different components of which are to be served by the functioning of the transducer heads. As is well known in the art, such circuits are partially closed through relay contacts in order to obtain selections as between those of them which are called upon by programming techniques to make a recording or a playback. The selected circuits are then fully closed by the gating effect of the synchronizing pulses, or certain counts thereof obtained by comparison means and in accordance with input control signals. This gating effect, as is well known, enables data pulses to be recorded or played back with limited reference to the precise linear portions of the magnetic record tracks where a given piece of information is to be stored or subsequently found.

It will be understood that my invention is capable of modification in various ways as to structure and mode of operation, without departing from the spirit and scope of the invention itself. It is not intended, therefore, that the claims should be limited in scope merely to the illustrative form of the invention as herein shown and described.

What is claimed is:

1. In a magnetic record scanning device, a rotatable magnetic recording medium having a plurality of circular recording tracks respectively of different radii for magnetically storing data pulses to be cyclically scanned, a source of selection signals, a transducer head and means controlled by said selection signals for selectively moving said head into scanning relation with a desired one of said recording tracks, and means to provide a suitable packing factor for the pulses stored in each of said record tracks of different radii, comprising a plurality of cyclical sources of timing pulses respectively synchronized with the periodicity of successive data pulses recorded on said record tracks, means operative in response to the selection of a particular record track for selecting a particular one of said cyclical sources of timing pulses properly synchronized with respect to the pulses recorded on the selected record track, and means for causing said transducer head to record or to play back recordings of data pulses from the selected record track coincident in phase with the selected cyclical source of timing pulses.

2. Apparatus according to claim 1, in which the frequencies of the cyclical sources of timing pulses respectively differ in accordance with the linear scanning speeds of the record tracks of different radii and to an extent to provide a substantially uniform packing factor of the stored data pulses along all of said record tracks.

3. Apparatus according to claim 1, in which said cyclical sources of timing pulses respectively comprise circular synchronizing tracks of different radii on a rotatable medium on which the timing pulses are magnetically stored, and a magnetic pickup head carried by means operative in response to the selection of a particular record track for moving said pickup head into scanning relation with a particular one of said synchronizing tracks in which the timing pulses are synchronized with respect to the pulses recorded on the selected record track.

4. Apparatus according to claim 3, including selector mechanism responsive to the selection signals, and means controlled by said selector mechanism for moving said transducer head into scanning relation with a particular one of the circular record tracks and automatically moving said pick-up head into scanning relation with a particular one of the synchronizing tracks in which the timing pulses are synchronized with respect to the pulses recorded on the selected record track.

5. Magnetic signal storage apparatus comprising a plurality of disks having magnetizable surfaces on the faces thereof each providing a plurality of concentric circular tracks respectively of different radii for magnetically stored pulses to be cyclically scanned, means for rotating said disks simultaneously for scanning purposes, transducer heads for certain of the faces of said disks for selectively scanning said circular tracks on which data pulses are stored, the circular tracks of one of said disks having magnetically stored thereon synchronizing pulses for timing the recording or play-back of pulses by the transducer heads in predetermined relation to the revolution rate of said disks, a pickup head for selectively scanning said synchronizing tracks, a mounting device for said transducer and pickup heads turnable through a predetermined arc to maintain a suitable scanning relation between each head and a corresponding disk face confronting the pole pieces of said head, means including a setting mechanism for turning said mounting device to position said heads each in scanning relation to a desired one of the concentric circular tracks on each of said disk faces, a source of selection signals and selector mechanism controlled thereby for actuating said setting mechanism to cause a transducer head to scan a desired record track and to cause said pickup head to scan a particular synchronizing track in which the timing pulses are properly synchronized with respect to the pulses recorded on the selected record track.

6. Apparatus according to claim 5, including a cam and cam-follower structure controlled by said selector mechanism for actuating said setting mechanism to cause the transducer and pickup heads respectively to scan the desired record and synchronizing tracks.

7. Apparatus according to claim 5, in which said disks are coaxially mounted on a driving shaft, and said transducer and pickup heads are carried by arms mounted on a pivotal axle turnable to positions determined by said setting mechanism, said axle being mounted in substantially parallel relation to the driving shaft on which said disks are mounted.

8. Apparatus according to claim 5, in which the radii of the concentric circular synchronizing tracks respectively are equal to the radii of the concentric circular record tracks.

References Cited in the file of this patent

UNITED STATES PATENTS

| | | |
|---|---|---|
| 2,080,100 | Tauschek | May 11, 1937 |
| 2,144,844 | Hickman | Jan. 24, 1939 |
| 2,587,532 | Schmidt | Feb. 26, 1952 |
| 2,601,154 | Krueger | June 17, 1952 |
| 2,620,389 | Potter | Dec. 2, 1952 |

OTHER REFERENCES

Electrical Engineering, August 1952, pp. 745–749.